(12) United States Patent
Throop et al.

(10) Patent No.: US 9,557,981 B2
(45) Date of Patent: Jan. 31, 2017

(54) METHOD AND APPARATUS FOR AUTOMATIC MODULE UPGRADE

(75) Inventors: Medville Jay Throop, Ann Arbor, MI (US); Brian David Tillman, Dearborn, MI (US); Scott David Wojtkowicz, Livonia, MI (US); Daniel William Forthoffer, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1086 days.

(21) Appl. No.: 13/190,600

(22) Filed: Jul. 26, 2011

(65) Prior Publication Data

US 2013/0031540 A1    Jan. 31, 2013

(51) Int. Cl.
*G06F 9/44*     (2006.01)
*G06F 9/445*    (2006.01)
*H04L 29/08*    (2006.01)

(52) U.S. Cl.
CPC ............... *G06F 8/61* (2013.01); *G06F 8/665* (2013.01); *H04L 67/12* (2013.01); *H04L 67/34* (2013.01)

(58) Field of Classification Search
CPC ....................................................... G06F 9/44
USPC ................... 717/168–171, 174–178
See application file for complete search history.

(56) References Cited

U.S. PATENT DOCUMENTS

| | | | |
|---|---|---|---|
| 7,366,589 B2 | 4/2008 | Habermas | |
| 7,506,309 B2 | 3/2009 | Schaefer | |
| 7,848,278 B2 | 12/2010 | Chen et al. | |
| 8,332,817 B2 | 12/2012 | Li et al. | |
| 2003/0167354 A1 | 9/2003 | Pepper et al. | |
| 2004/0187011 A1* | 9/2004 | Lee et al. | 713/193 |
| 2004/0261073 A1* | 12/2004 | Herle et al. | 717/173 |
| 2005/0149481 A1* | 7/2005 | Hesselink et al. | 707/1 |
| 2005/0152318 A1 | 7/2005 | Elbatt et al. | |
| 2005/0216902 A1 | 9/2005 | Schaefer | |
| 2005/0216903 A1* | 9/2005 | Schaefer | G07C 5/008 717/168 |

(Continued)

FOREIGN PATENT DOCUMENTS

DE      102004017602 A1    10/2005
WO       2009027208 A1     5/2009

OTHER PUBLICATIONS

Cisco ("Cisco Application Control Engine Module Administration Guide"), Feb. 2011.*

(Continued)

*Primary Examiner* — Chat Do
*Assistant Examiner* — Jae Jeon
(74) *Attorney, Agent, or Firm* — Jennifer Stec; Brooks Kushman P.C.

(57) ABSTRACT

A computer-implemented method includes determining that a connection to an update server should be established. The method also includes establishing a wireless connection with the update server. The method further includes sending at least a VIN number to the update server and downloading one or more module updates corresponding to the sent VIN number. Also, the method includes verifying the one or more downloaded updates. The method further includes flashing one or more modules to which the one or more updates correspond. Additionally, the method includes verifying the functionality of each module which has been flashed.

11 Claims, 4 Drawing Sheets

(56) References Cited

U.S. PATENT DOCUMENTS

| | | | |
|---|---|---|---|
| 2005/0256614 A1* | 11/2005 | Habermas | G06F 8/65 701/1 |
| 2007/0168957 A1 | 7/2007 | Li et al. | |
| 2007/0185624 A1 | 8/2007 | Duddles et al. | |
| 2008/0005733 A1 | 1/2008 | Ramachandran et al. | |
| 2008/0162036 A1 | 7/2008 | Breed | |
| 2009/0260057 A1 | 10/2009 | Laberteaux et al. | |
| 2011/0078675 A1 | 3/2011 | Van Camp et al. | |
| 2012/0144378 A1 | 6/2012 | Shah | |
| 2013/0031540 A1 | 1/2013 | Throop et al. | |

OTHER PUBLICATIONS

Drew Technologies—CarDAQ-Plus J2534 Pass-Thru & Hosting Device, printed from allobd.com/proddetail, Oct. 29, 2010.
Lancer Evolution: ECU Reflash Upgrade—2009 Ralliart remote ECU reflashing services, printed from http://www.floridaevosclub. com/f32/2009-ralliart-remote-ecu-reflashing-services-41.htm, Sep. 17, 2009.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Chinese Patent Office, First Office Action for the corresponding Chinese Patent Application No. 201210252758.5, mailed Jul. 20, 2016.

* cited by examiner

METHOD AND APPARATUS FOR AUTOMATIC MODULE UPGRADE

TECHNICAL FIELD

The illustrative embodiments generally relate to a method and apparatus for automatic module upgrade.

BACKGROUND

While older vehicles used to be largely mechanically controlled, modern vehicles have a significant number of software components and computerized hardware components that control vehicle subsystems. These components can react to changes in vehicles states to provide advanced degrees of vehicle control and functionality. Additionally, many of these components can interact with each other, linking various modules of the vehicle over one or more data networks, such as, but not limited to, a vehicle CAN bus.

These modules, whether software or firmware, are capable of being dynamically updated. In other words, if an improvement or correction to a module is needed, a change can be made to the module without simply obtaining a newer vehicle reflecting the change. Changes may also be made for diagnostic purposes, and even customized modules can be employed for a group of vehicles, such as a fleet.

Typically, when a change to a module is needed, the vehicle is brought to a diagnostic point where a technician is present, or a technician with diagnostic and update tools is deployed to the vehicle. The technician can access the desired software module(s), make any needed changes, verify that the change has been properly implemented, and then move on to a next vehicle.

If changes are to be made to particular vehicles in a fleet, or all vehicles having a certain designation, and those vehicles are not in proximity to one another, it could take a while to implement the changes to all the vehicles.

In addition to having software control modules, many vehicles are equipped with one or more transceivers. Capable of either direct communication with a remote network, or communication with a wireless device through which the transceivers connect to the remote network, these vehicles can communicate with remote servers and terminals through a wireless connection.

SUMMARY

In a first illustrative embodiment, a computer-implemented method includes determining that a connection to an update server should be established. The illustrative method also includes establishing a wireless connection with the update server.

The illustrative method further includes sending at least a VIN number to the update server and downloading one or more module updates corresponding to the sent VIN number. Also, the illustrative method includes verifying the one or more downloaded updates. The method further includes flashing one or more modules to which the one or more updates correspond. Additionally, the illustrative method includes verifying the functionality of each module which has been flashed.

In a second illustrative embodiment, a computer readable storage medium stores instructions that, when executed by a vehicle computing system, cause a processor thereof to perform the method including determining that a connection to an update server should be established. The illustrative method also includes establishing a wireless connection with the update server and sending at least a VIN number to the update server.

Also, the method includes downloading one or more module updates corresponding to the sent VIN number and verifying the one or more downloaded updates. The illustrative method further includes flashing one or more modules to which the one or more updates correspond and verifying the functionality of each module which has been flashed.

In a third illustrative embodiment, a system includes at least one remote terminal, at least one update server, and a plurality of vehicles each having at least a VIN number associated therewith and at least one updateable software module installed thereon. In this embodiment, an authorized user can access the at least one update server from the at least one remote terminal to instruct updating of at least one of the vehicles identified by a VIN number. Also, a communication system of the at least one vehicle to be updated is operable to establish communication with the update server and to transmit the VIN number associated with the vehicle thereto.

In this non-limiting example, responsive to reception of the VIN number, the update server is operable to send an updated software module installation package to the vehicle. Additionally, upon receipt of the updated software module installation package, the vehicle is operable to reflash a software module corresponding to the updated software module installation package.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
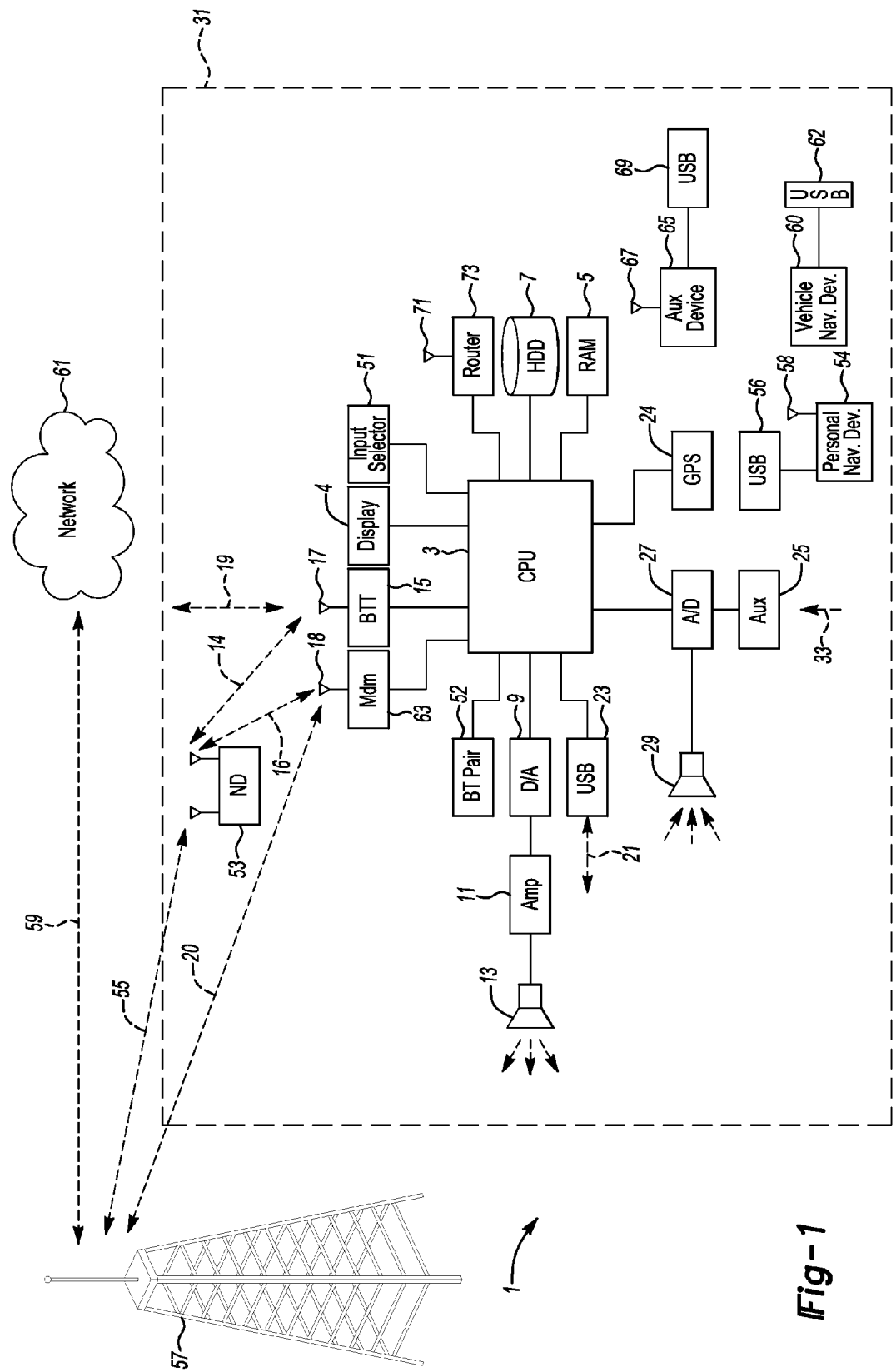
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Through use of the Internet and other cloud-based computing, it is possible to update specific modules on a plurality of specific vehicles connectable to a network, regardless of vehicle location. Embedded software in the vehicle can perform the task of verifying module updates, and can repair modules when the update was unsuccessful.

Further, the embedded software can automatically or periodically seek out updates, or at least communicate with a remote update source to see if a specific vehicle has been selected for updating. In another embodiment, an update source can seek out specific vehicles and determine if they are "awake" and available to have an update installed thereon.

Vehicles can be selected for updating based on, for example, VIN numbers, which are specific to particular vehicles. To update a fleet, a plurality of VIN numbers can be designated for update, and then an entire fleet can be easily updated remotely, regardless of the locations of the update server and the vehicles within the fleet.

Figure 2:
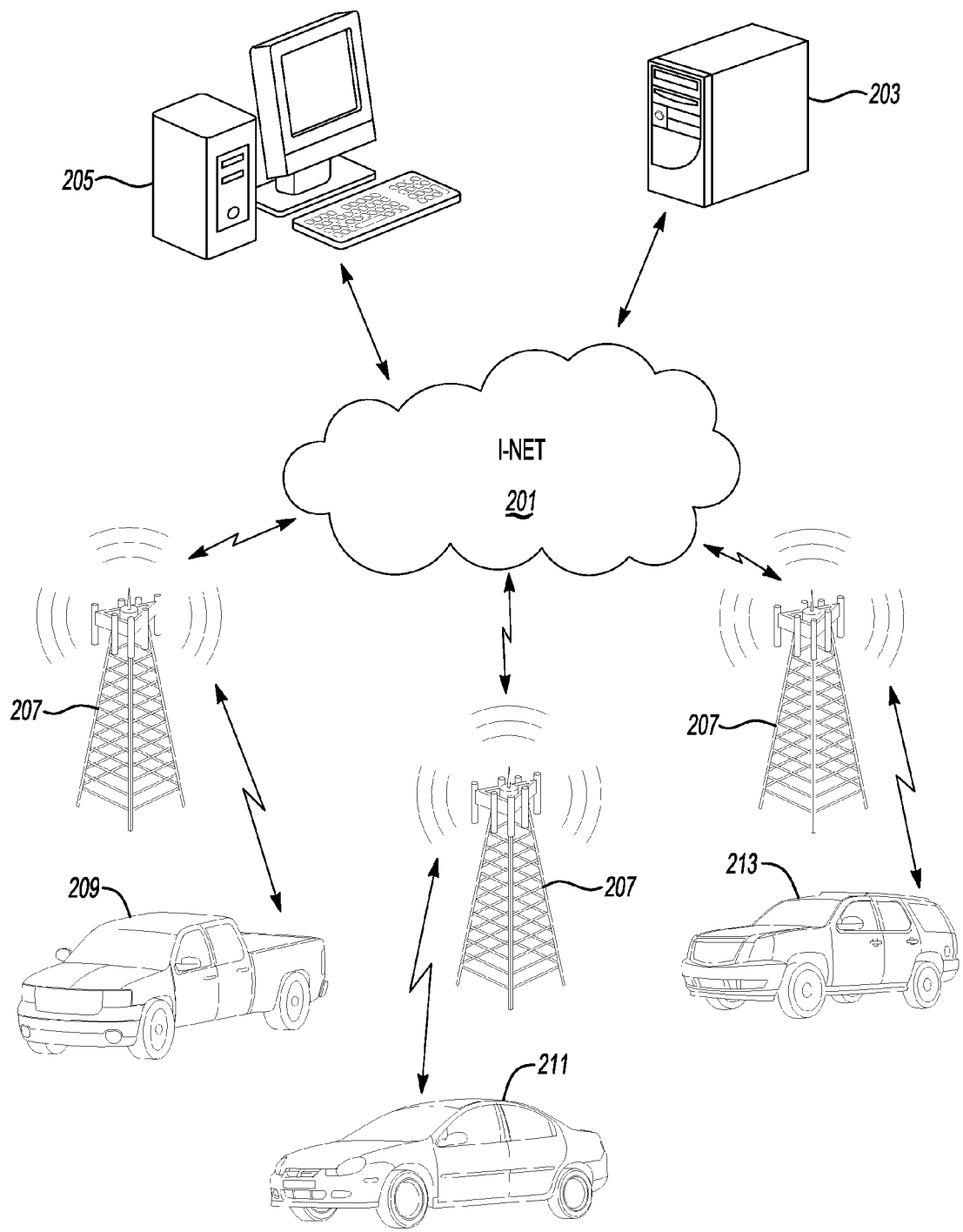
FIG. 2 shows an illustrative example of a vehicle communication network.

FIG. 2 shows an illustrative example of a vehicle communication network. In this illustrative example, one or more authorized users have access to one or more workstations 205. These workstations do not necessarily need to be located in the proximity of a vehicle, nor do they need to be located in the proximity of a server that will send updates to a vehicle for module alteration.

From the workstation 205, a user can connect to an update server 203. Once a connection to the update server has been established (and verified, if needed), the user can, for example, send one or more module updates to the server. Additionally or alternatively, the verified user can select one or more updates that already reside on the server and instruct the server to apply those updates to a vehicle or vehicles.

Many times, it is not desirable to update all vehicles in communication with the server with the same update. For example, without limitation, it may be the case that a fleet-specific update to a module is desired, and the updates are only to be applied to known vehicles comprising a fleet of vehicles.

In other instances, engineers in several locations worldwide may be testing particular vehicles, and it may be desirable to provide those specific vehicles with module updates. This can allow the engineers to observe the effects of the module updates, without applying the updates to numerous vehicles that are in consumer use on the road.

In still another instance, module upgrades may be available for purchase, and only upon purchase of an upgrade will a vehicle be designated for a module update.

In this illustrative example, vehicles whose modules are to be updated are designated by VIN number, as this is one method of identifying specific vehicles. Other suitable methods of specific vehicle identification may also be employed.

Vehicles 209, 211 and 213 have vehicle computing system installed therein. These computing systems are capable of connecting to the internet in a wireless manner. In one embodiment, a VCS such as that described with respect to FIG. 1 can be used to connect to the Internet. In another example, an embedded wireless phone modem or broadband wifi device may be used by the VCS to communicate with the Internet.

In many of these instances, communication is facilitated through the use of cellular networks 207, although other suitable means of providing remote wireless access to the Internet may also be used. A communication system should be stable enough to allow the VCS to complete download of the required module(s), and to complete any verification or backup that may be needed through communication with the remote update server as well.

In one example, once vehicles have been designated for a module update, the server 205 will seek out the vehicles to determine if they are currently online and in communication with the cloud. Since the server may have access to a network with which the vehicles communicate, it is possible for the server to determine if a particular vehicle is "online."

For each designated vehicle, the remote update server can verify that an update is processed, and then dequeue the particular vehicle from a list of vehicle's whose modules need updating. If a connection cannot be established, the server can periodically poll for connected vehicles until a given vehicle is determined to be online.

In another illustrative embodiment, a module running on a vehicle computing system may periodically check a remote server to see if that particular vehicle is scheduled for a module update. In such an embodiment, the checks may be done at regular time intervals, whenever the vehicle is activated, or in any other suitable manner.

When the module establishes communication with an update server, if an update is needed the necessary method can be performed to enact the update. If no update is needed, the module may sleep until such time as another check is made to the server.

Figure 3:
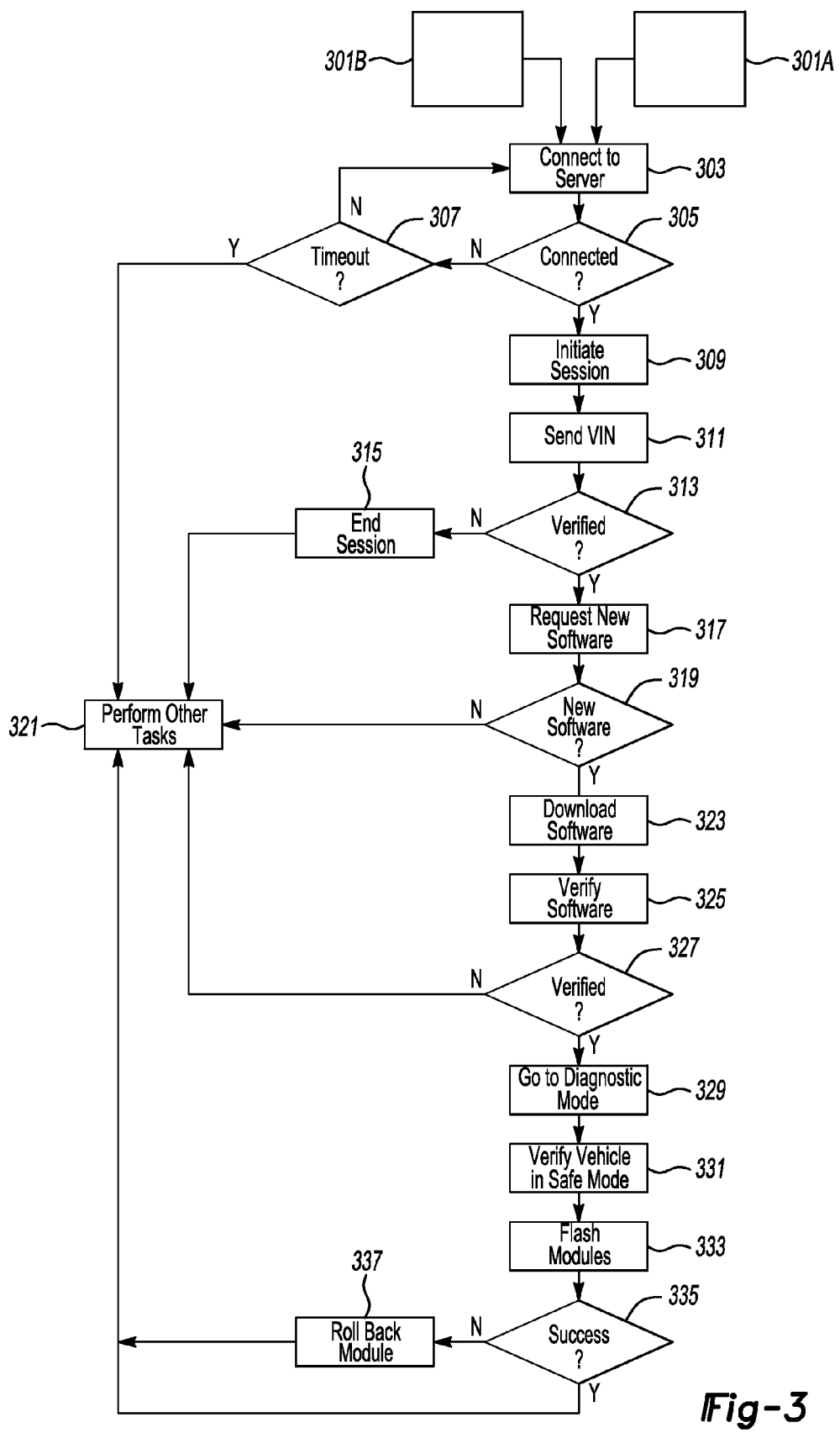
FIG. 3 shows an illustrative example of a module update process.

FIG. 3 shows an illustrative example of a module update process. In this illustrative embodiment, initiation of the communication with the server is caused by one of several suitable processes. Two non-limiting examples of suitable processes are shown with respect to FIGS. 301A and 301B.

Step 301A demonstrates a case where traffic appears on a vehicle CAN bus causing a telematics module to attempt to establish communication with an update server. In this example, two non-limiting instances that may instigate traffic on the CAN bus include a key-on event and/or an external stimulus such as a key fob activation or a vehicle in charging state (if the vehicle has some portion of its motive power delivered by battery, such as is the case with a battery electric vehicle or hybrid electric vehicle).

Additionally or alternatively, an internal clock may "wake up" a telematics module and request that a call to the update server be made to check for updates 301B. This could be the case, for example, if the telematics module is programmed to periodically check for updates.

Once it has been determined that a call should be made to an update server, the process may then attempt to establish a server connection 303. This connection can be established by a cellular modem, a wifi connection, or any other suitable means of establishing a wireless communication with a remote server.

Next, the process may check to see if communication with the server has been established 305. Due to spotty data connectivity, server outages, or a plurality of other known reasons, it may not be possible to establish communication with a remote server when the connection is requested. Connection attempts may continue, however, for a predefined periodic time 307 until such time has passed.

If connection cannot be established, any remaining tasks not requiring connection may be performed by the telematics module until the module returns to a resting state 321. If, for example, a telematics module is set for periodic updates, and communication cannot be established, the module may check again for available communication prior to a "normal" update time. In this manner, proximate time checks can be made for updates if communication cannot be established at the desired time.

If a connection is established, the telematics module may begin an encrypted session using, for example, public/private key encryption and exchange of digital certificates 309. Additionally, the vehicle VIN may be sent to the server for verification 311. Since the VIN uniquely identifies the vehicle, sending an improper or invalid VIN may result in rejection of a telematics session, even if the module otherwise establishes secure communication.

If the module communication request and/or VIN (or other identifier) is not validated 313, the process may end the communication 315 and the telematics module can perform any remaining non-session tasks 321. If the VIN is verified 313, the telematics module may send a request to the server for any server commands it is to execute or updates for any vehicle modules 317.

Since the remote server knows the VIN (or other identifier) of the specific vehicle on which the telematics module resides, the server can check to see if any specific module updates or changes are designated for delivery to the vehicle. In this manner, only vehicles that have been specifically flagged for module adjustment can be updated, if desired.

If the vehicle has no module updates scheduled 319, the process may exit, ending the session and allowing the telematics module to perform any remaining necessary non-session tasks 321. If an update is scheduled for that particular vehicle, software corresponding to the update may be downloaded 323.

In addition to downloading software corresponding to a server instructed update, the telematics module may download restoration software at the download step. The restoration software may be usable to restore a module to a previously functioning state in the event that an update fails for some reason. For example, if a particular module has a version associated therewith, the process may download the update to establish that version in addition to downloading an update to establish a new version.

Once a download is completed, and before installation or reflash using a newly downloaded module is performed, the telematics module or an associated verification module may check to ensure that there are no errors associated with the downloaded update 325. Verification progress may be reported to the server (so that the server is informed of any potential errors, for example).

If the software cannot be verified 327, redownload may be attempted, or the session may end and the telematics module may be allowed to perform non-session tasks 321. If the software is verified, the telematics module may place itself into a diagnostic tool mode 329.

In the on-site version of module update, a technician may update software using a diagnostic tool designed to reflash modules. In one embodiment, the telematics module may place itself into a diagnostic mode designed to replicate at least some of the functionality of the tool, at least with respect to module reflash. By placing itself into this mode, the telematics module may be able to access vehicle modules to reflash the modules.

Since various modules running and existing on vehicle computing systems may affect vehicle control systems, such as, for example, powertrain control, it could be undesirable to reflash the modules if the vehicle is currently in operation (e.g., traveling). Especially if the module update fails, it would not be desirable to leave the vehicle in an operating state without access to one or more system control modules that may affect the operation of the vehicle.

Accordingly, in this illustrative example, the process verifies that the vehicle is in a suitable state for module reflash 331 prior to actually attempting to reflash a module. Since the vehicle will be in a "safe" state, if module reflash failure occurs, there should be little to no impact on the state of the vehicle, as a prior operational state of the module can be established in the event of reflash failure. Safe state can include, but is not limited to key-on/engine-off state, and may even require driver verification through interaction with the driver (e.g., without limitation, through a vehicle display system).

Once a safe vehicle state has been confirmed, the telematics module may attempt to flash the module(s) requiring reflash 333. In at least one embodiment, the telematics module will emulate a diagnostics tool, and perform the functions as if a diagnostics tool were hooked to the vehicle. Reflash progress can be reported to the server as the flash occurs, so that the server will know if a module is being/was successfully flashed.

Once the flash is completed, the telematics module may check to ensure that the flash was completed successfully 335. Checks can include, but are not limited to, running diagnostics on the flashed module, checking the module for errors, etc. A successful, error-free flash can be reported to the server so that the server can remove the vehicle from a list of needed updates for that module.

If the flash was unsuccessful, or if an error is detected with the newly flashed module, operation of the vehicle may be impaired if the module is allowed to remain in a current state and the vehicle is operated. Accordingly, a restoration or rollback may be performed on the module 337. This can include, but is not limited to, restoring the module using a flash to a known working state downloaded from the server, or restoring the module using a flash to a known working state established prior to attempting flash (e.g., using a saved back-up state). A rolled-back module can then be checked for errors as well, and additional procedures can be undertaken if the restoration encountered problems.

Figure 4:
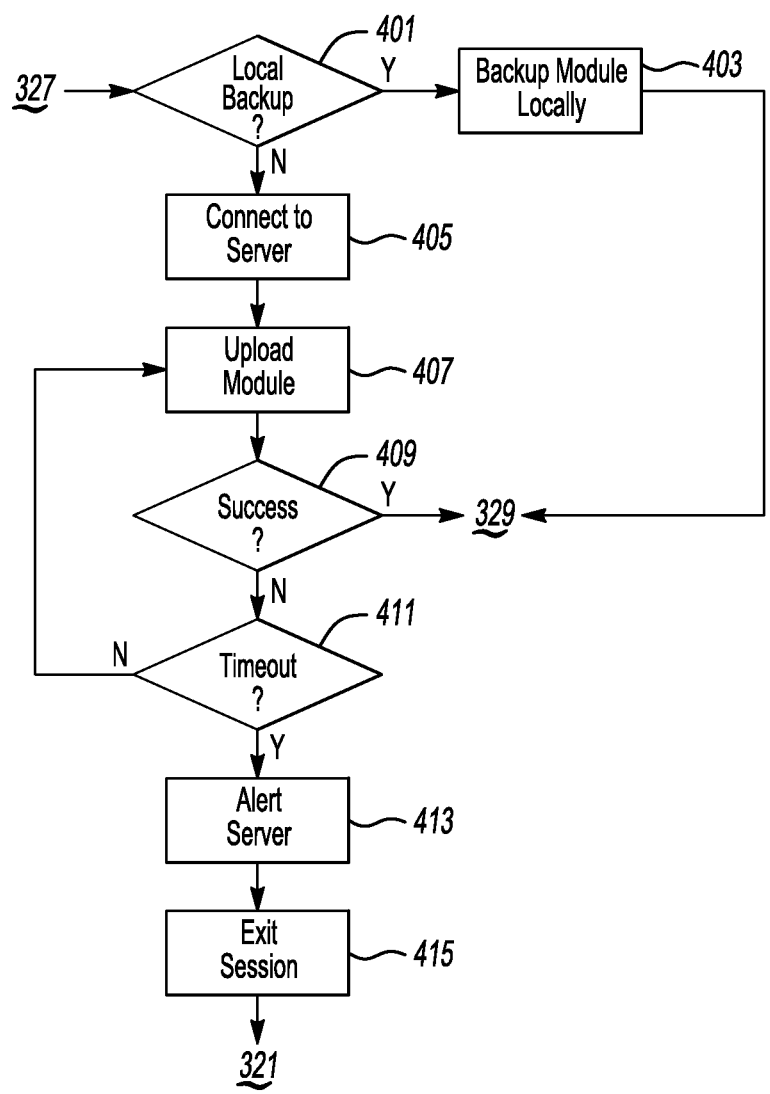
FIG. 4 shows an illustrative example of a module backup process.

FIG. 4 shows an illustrative example of a module backup process. In this illustrative embodiment, a copy is made of a known working state of a module before flash is attempted. This may be done in addition to, or alternatively to, downloading software that allows the module to be reflashed to a known state from the server during software download.

In this illustrative example, it is determined if memory exists locally to which a backup state can be saved 401. If there is sufficient or available local memory for backup, the process can save a copy of the module in a working state 403, for use in the event that a flash procedure fails.

If no local backup is available, the process may connect to the server (or use an existing, established connection) 405. A backup copy of the module may then be uploaded to the server, where it can be saved for rollback 407. This copy may be saved for some period of time, in the event that it is needed at a later date if a later flash attempt fails.

The upload process may be attempted for some time 411, until it is successfully completed 409. If the process times out before the upload is successful, and if no other means of restoring an improperly flashed module exists, the process may alert the server (and/or vehicle occupant, remote operator, etc.) of the unsuccessful upload 413 and end the session 415. Although it is not necessary to end the session, it may be desirable if no other means of restoring the module to a working state can be established before attempting the flash of the module to the new version.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer readable storage medium storing instructions that, when executed by a vehicle computing system, cause a processor thereof to perform the method comprising:
   determining at a vehicle that a connection to an update server should be established;
   establishing a wireless connection between the vehicle and the update server using a wireless device in wireless communication with a vehicle computing system;
   sending at least a vehicle identification number (VIN) number to the update server;
   downloading one or more module updates corresponding to the sent VIN number;
   flashing one or more modules to which the one or more updates correspond;
   saving a backup copy of the modules in a working state in the event that the flashing fails if memory exists locally;
   reconnecting to the update server to upload the backup copy of the modules to the update server if no local backup is available, where it can be temporarily saved for rollback if the flashing fails; and
   alerting the update server in the event of an unsuccessful upload when the wireless connection times out before the upload is successful and if no other means of restoring an improperly flashed module exists.

2. The computer readable storage medium of claim 1, wherein the determining includes, receiving a request from the update server that a connection be established.

3. The computer readable storage medium of claim 1, wherein the determining includes determining that a period of time has elapsed since a last connection to the update server.

4. The computer readable storage medium of claim 1, wherein the method further comprises restoring a module to a previously known working state if the functionality of a module which has been flashed cannot be verified.

5. The computer readable storage medium of claim 4, wherein the method further comprises, for at least one module update, downloading a restore package corresponding to a known working state of a module to which the update corresponds.

6. A system comprising:
   at least one remote terminal;
   at least one update server; and
   a plurality of vehicles each having at least a vehicle identification number (VIN) number associated therewith and at least one updateable software module installed thereon, wherein
   an authorized user can access the at least one update server from the at least one remote terminal to instruct updating of a plurality of the vehicles identified by a VIN number, wherein
   a communication system of the at least one vehicle to be updated is operable to establish communication with the update server and to transmit the VIN number associated with the vehicle thereto, wherein
   responsive to reception of the VIN number, the update server is operable to send an updated software module installation package to the vehicle, wherein
   upon receipt of the updated software module installation package, the vehicle is operable to reflash a software module corresponding to the updated software module installation package, wherein
   the vehicle is operable to save a backup copy of the software modules in a working state in the event that the flashing fails if memory exists locally, wherein
   the vehicle is operable to reconnect to the update server to upload the backup copy of the software modules to the update server if no local backup is available, where it can be temporarily saved for rollback if the flashing fails, and wherein
   the update server is alerted in the event of an unsuccessful upload when the wireless connection times out before the upload is successful and if no other means of restoring an improperly flashed software module exists.

7. The system of claim 6, wherein the communication system of the at least one vehicle includes a transceiver operable to connect to the update server through an intermediary wireless device.

8. The system of claim 7, wherein the intermediary wireless device is a cellular phone.

9. The system of claim 7, wherein the intermediary wireless device is a wireless router.

10. The system of claim 6, wherein the update server is further operable to send a software restoration package to the vehicle, the package corresponding to a known working version of the software module.

11. The system of claim 10, wherein the known working version of the software module is a current version of the software module prior to the reflash.

* * * * *